United States Patent [19]

Sakai et al.

[11] Patent Number: 4,902,330

[45] Date of Patent: Feb. 20, 1990

[54] METHOD OF PRODUCING GRADIENT-INDEX LENS

[75] Inventors: Hiroyuki Sakai; Yoshiyuki Asahara, both of Tokyo; Shigeaki Omi, Saitama; Shin Nakayama; Yoshitaka Yoneda, both of Tokyo, all of Japan

[73] Assignee: Hoya Corporation, Tokyo, Japan

[21] Appl. No.: 228,780

[22] Filed: Aug. 4, 1988

[30] Foreign Application Priority Data

Mar. 29, 1985 [JP] Japan .................................. 60-63697

[51] Int. Cl.⁴ .............................................. C03C 21/00
[52] U.S. Cl. .................................... 65/30.13; 65/3.14; 350/417
[58] Field of Search ...................... 65/30.13, 3.14, 116; 350/413, 417

[56] References Cited

U.S. PATENT DOCUMENTS 3,888,648  6/1975  West et al. ................... 65/3.14 X
3,941,474  3/1976  Kitano et al. ................. 65/3.14 X

FOREIGN PATENT DOCUMENTS 58-17407  2/1983  Japan .................................. 65/30.13
59-64547  4/1984  Japan .................................. 65/30.13

OTHER PUBLICATIONS

French et al., Ceramic Bulletin, Nov. 1970, pp. 974–977, vol. 49, No. 11.
Giallorenzi et al., Applied Optics, vol. 12, No. 6, Jun. 1973, pp. 1240–1245.
Pearson et al., Applied Physics Letters, vol. 15, No. 2, Jul. 15, 1969, pp. 76–77.
Kitano et al., Proceedings of First Conference on Solid State Devices, Tokyo 1969, Supplement to J. Japan Society of Applied Physics, vol. 39, 1970, pp. 63–70.

*Primary Examiner*—Kenneth M. Schor
*Attorney, Agent, or Firm*—Cushman, Darby & Cushman

[57] ABSTRACT

A method of producing a gradient-index lens includes a first step in which a glass body is immersed into a molten salt containing ions which are able to provide a refractive index higher than that of ions constituting the glass body, in order to perform ion diffusion into the glass body. Thereafter, in a second step the glass body obtained from the first step is immersed into a molten salt containing ions which provide a refractive index lower than that of the ions of the molten salt used in the first step. In this way there is formed a predetermined refractive index distribution in the glass body.

6 Claims, 3 Drawing Sheets

METHOD OF PRODUCING GRADIENT-INDEX LENS

This is a continuation of application Ser. No. 06/840,081, filed Mar. 17, 1986, which was abandoned upon the filing hereof.

FIELD OF THE INVENTION

The invention relates to a method of producing a gradient-index lens having a large numerical aperture and a low aberration. The invention is especially applicable for optically coupling a light transmitting fiber and a laser diode light source, a pickup for an optical disk, etc.

BACKGROUND OF THE INVENTION

Light beam controlling techniques, in an optical fiber communication system, include a light source-optical fiber coupling technique in which output light from a laser diode (LD) or a light emission diode (LED), serving as a light source, is efficiently coupled to an optical fiber, serving as a transmitting path. This is an important technique in improving the reliability in optical communication. Generally, it has been proposed in such an arrangement that output light from a light source is condensed by using an optical element such as a lens, or the like, to thereby improve the efficiency in coupling to an optical fiber. A spherical lens, a gradient-index rod lens, or the like, has been used as the optical element. Further, as a pickup lens for an optical disk in which an enormous quantity of data can be recorded, the use of the gradient-index lens has been developed.

Conventionally, the gradient-index lens has been produced in such a manner that a glass body contains a large quantity of ions, such as $Tl^+$ ions or the like for providing a high refractive index, is prepared in advance. The glass body is then immersed into molten salt containing $Na^+$, $K^+$ ions or the like to perform ion-exchange, in order to form a distribution of ion concentration for providing a higher refractive index thereby obtaining a refractive index distribution in the glass body. That is, the higher the concentration of contained ions for providing the high refractive index in the glass body, prepared in advance, becomes, the larger becomes the refractive index difference as well as the numerical aperture of the obtained gradient-index lens.

It is often difficult, however, to produce glass containing a large quantity of ions for providing a high refractive index, in view of the stability or durability of the glass. In particular, it is difficult to produce glass containing a large quantity of $Ag^+$ or $Li^+$ ions because the glass is devitrified in cooling. Further, in the case where the glass is used for condensation of the LD light source and as a pickup for the optical disk, as described above, it has been known that a numerical aperture N.A. not smaller than 0.6 is necessary. Therefore, it has been difficult to produce such glass, as described above, by using the conventional method of producing a gradient-index lens.

SUMMARY OF THE INVENTION

The invention has been accomplished in consideration of the above prior art problems. An object of the invention is to provide a gradient-index lens having a large refractive index difference, that is, a large numerical aperture, through ion-exchange performed twice, through a first step where ions for providing a high refractive index are introduced into a glass body and a second step where the ions are externally diffused out of the glass body to form a refractive index gradient.

According to the invention, ion exchange is sufficiently performed with respect to a glass body containing a large quantity of alkali metal ions such as $Na^+$, $K^+$ ions, or the like, in fused salt containing ions such as $Ag^+$, $Tl^+$, $Li^+$, or the like, for providing a high refractive index so as to make uniformly high the refractive index of the glass body. Thereafter, the ion exchange is performed again with respect to the glass body in molten salt containing $Na^+$, $K^+$ ions, or the like, to thereby form a refractive index gradient due to the concentration distribution of the ions for providing the high refractive index, thereby obtaining the desired lens material.

In the case where glass containing a large quantity of $Ag^+$, or $Li^+$ ions would be produced in advance in the same manner as in the conventional method, it often happens that the glass is devitrified in cooling because it is unstable, so that the production of the glass is difficult. For example, as the glass composition for the gradient-index lens containing Li as its component, a silicate group glass composition containing $Li_2O$ or $TiO_2$ as its component is well-known (Japanese Patent Publication No. 59-41934 and Japanese Patent Unexamined Publication No. 58-120539). FIG. 1 shows the glass-forming region of the $SiO_2$-$TiO_2$-$M'_2O$ (M'=Li, Na, K) group [Journal of the Ceramic Society of Japan Vol. 71, No. 12, page 215 (1963)]. As compared with $Na_2O$ and $K_2O$ respectively occupying the glass-forming region shown by the reference numerals 2 and 3 in the drawing, $LiO_2$ is extremely unstable, as shown by the reference numeral 1. Further, if a large quantity of $Ag^+$ ions were introduced, borosilicate glass is easily colored by silver colloid, and even in the phosphate glass, which is also well known, in that it can contain a large quantity of $Ag_2O$. In the case where the phosphate glass has composition obtained by substituting a part of alkali of glass referred to as TiF6 (composition by weight percent; 47.9% of $P_2O_5$, 19.8% of $Na_2O$, 7.7% of $K_2O$, 3.7% of $Al_2O_3$, 15.4% of $TiO_2$, and 1.6% of the others) by $Ag_2O$, metal Ag is deposited while $Ag_2O$ is dissolved with 2-3 mol% so as to make it difficult to produce the glass.

According to the invention, however, glass containing a large quantity of $Na^+$ or $K^+$ ions has a broad glass-forming region and can be stably produced. Further, it is relatively easy to introduce $Ag^+$ or $Li^+$ ions through ion exchange to thereby make it possible to obtain a glass body having ions of high concentration, for providing a high refractive index. Therefore, according to the invention, it is possible to stably produce a gradient-index lens having a large numerical aperture by using the thus obtained glass body having ions of high concentration for providing a high refractive index.

DETAILED DESCRIPTION OF THE INVENTION

Figure 1:
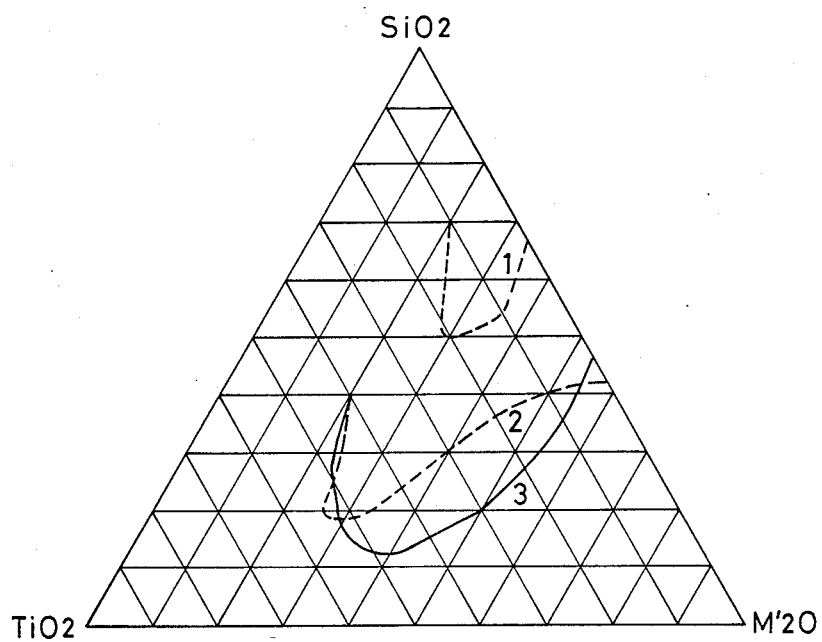
FIG. 1 is a diagram for explaining the glass-forming region of the $SiO_2$-$TiO_2$-$M'_2O$ (M'=Li, Na, K) group.
Figure 2A:
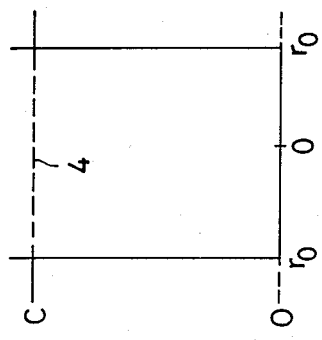
FIGS. 2A to 2F are diagrams for explaining changes in distribution of ion concentration in a series of producing steps according to the invention.
Figure 2B:
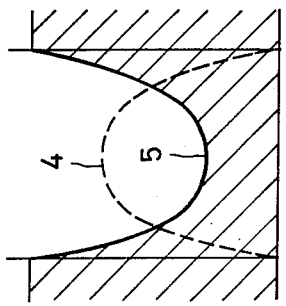
Figure 2C:
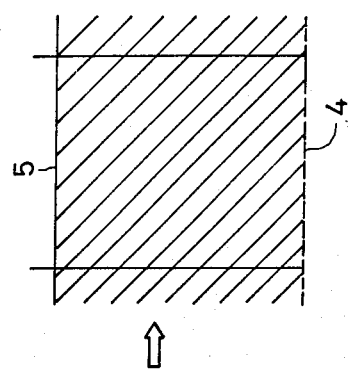
Figure 2D:
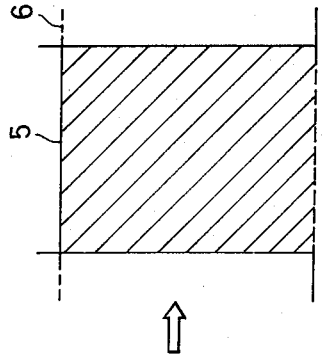
Figure 2E:
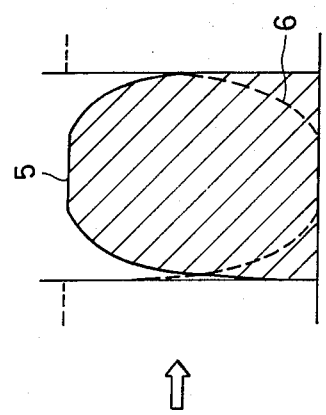
Figure 2F:
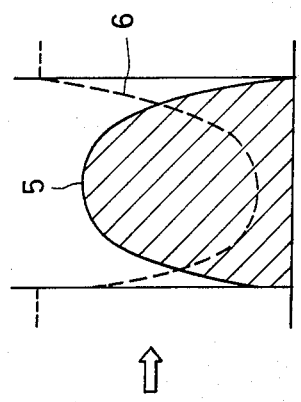

FIGS. 2A to 2F show changes in distribution of ion concentration C relative to the radius r of a glass body in a series of steps according to the present invention. First, the glass body containing a large quantity of first $Na^+$ or $K^+$ ions (ions [I]) is prepared. The glass body has uniform ion concentration from the center in the direction of radial r as shown by dashed line 4 in FIG. 2A. The glass body is immersed into molten salt containing second nitrate or sulfate ions (ions [II]) such as $Ag^+$, $Li^+$, $Tl^+$, or the like, for providing a high refractive index to exchange the ions [I] in the glass body for the ions [II] in the molten salt. In this state, the ions [I] in the glass body are diffused to thereby change the concentration of the ions [I] as shown by dotted curve 4, and the ions [II] are diffused as shown by solid curve 5 in FIG. 2B. When the ion exchange has been sufficiently performed and has reached to its equilibrium state shown in FIG. 2C, the glass body has uniform ion concentration from the center in the direction of radial r as shown by solid line 5, resulting in a glass body having a composition which is difficult to be prepared by the melting method and having a high refractive index. The glass body is taken out of the molten salt, and then immersed in molten salt such as $KNO_3$, $NaNO_3$, or the like, containing third ions (ions [III]) for contributing to the refractive index at a smaller degree than the ions [II] (see FIG. 2D) to exchange the ions [II] in the glass body for the ions [III] in the molten salt (see FIG. 2E). In this step, a distribution (reference numeral 5) of the concentration of ions [II] is controlled so as to obtain a glass body having a large refractive index difference (see FIG. 2F). Further, reference numeral 6 designates a distribution of the concentration of ions [III].

Figure 5A:
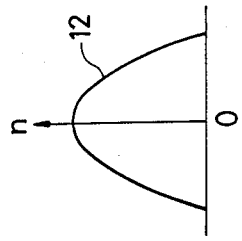
FIGS. 5A and 5B are a perspective view showing the gradient-index spherical lens and a diagram for explaining the refractive index distribution thereof, respectively.
Figure 5B:
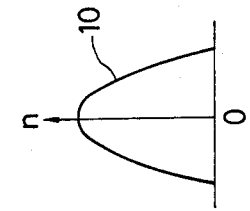
Figure 4A:
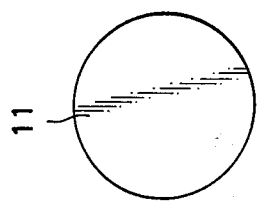
FIGS. 4A and 4B are a perspective view showing the one-directional gradient-index slab lens and a diagram for explaining the refractive index distribution thereof, respectively.
Figure 4B:
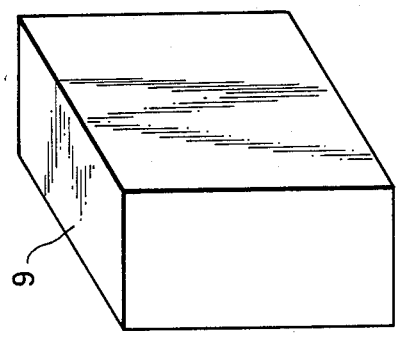
Figure 3A:
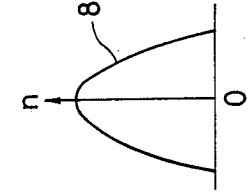
FIGS. 3A and 3B are a perspective view showing the gradient-index rod lens and a diagram for explaining the refractive index distribution thereof, respectively.
Figure 3B:
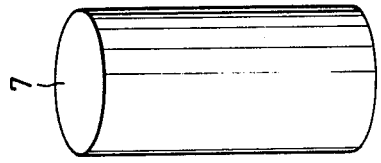

According to the invention, it is possible to produce various kinds of gradient-index type lenses by varying the shape of the glass body. For example, by using a cylindrical glass body as shown in FIG. 3A, it is possible to produce a gradient-index rod lens in which the refractive index is gradually radially reduced from its center as shown in FIG. 3B. On the other hand, by performing the ion exchange through both surfaces of a glass plate, as shown in FIG. 4A, it is possible to produce a one-dimensional gradient-index having a refractive index distribution only in the direction of its thickness as shown in FIG. 4B. Further, by using a spherical glass body as shown in FIG. 5A, it is possible to produce a gradient-index spherical lens in which the refractive index is radially changed from its center as shown in FIG. 5B.

Further, the duration of ion exchange is adjusted in the first step where the ions [II] are introduced into the glass body. In this way, the ion exchange in the second step is performed in the state where the distribution of ion concentration is nonuniform, thereby making it possible to control the distribution of ion concentration finally obtained.

Examples according to the present invention will be described hereunder, but it should be appreciated that such examples are merely provided for illustration and explanation of the invention and that the invention is not limited thereto as will be recognized by those skilled in the art.

EXAMPLE 1

A glass rod having a diameter of 3 mm and composed of phosphate glass containing 40% of $Na_2O$ by mol percent was immersed in molten salt at a temperature of 400° C., composed of 40% of $AgNO_3$ and 60% of $KNO_3$ by weight percent, for 240 hours to perform ion exchange between $Na^+$ and $Ag^+$ ions. Next, this glass rod was immersed into $NaNO_3$ at a temperature of 400° C. to perform the ion exchange of the second step. In this step, the distribution of $Ag^+$ concentration was changed as the time of ion exchange and in the case where the time of ion exchange is selected to be 18 hours, a lens having a difference in refractive index of 0.14 between the center and periphery and a numerical aperture of 0.69 was obtained.

EXAMPLE 2

Optical glass referred to as TiF6 was immersed in molten salt, at a temperature of 350° C., having the same composition as that in Example 1, to effect ion exchange in the first step to thereby change the refractive index of the glass body from 1.617 to 1.816. Next, this glass body was immersed in $KNO_3$ at a temperature of 350° C. to perform ion exchange in the second step and to thereby obtain the refractive index in the surface of the glass body of 1.683 and the difference in refractive index between the surface and the center of 0.133.

EXAMPLE 3

A glass bar having a diameter of 1 mm and composed of optical glass referred to as $BK^7$ was immersed in fused salt having a temperature of 540° C. and composed of 30% of $Tl_2SO_4$, 40% of $ZnSO_4$, and 30% of $K_2SO_4$ by mol percent to perform ion exchange in the first step to thereby change the refractive index from 1.517 to 1.596. This glass rod was immersed in molten salt at a temperature of 540° C. and composed of $KNO_3$ to effect the ion exchange again to thereby obtain the refractive index in the surface of 1.569 and the difference in refractive index between the surface and the central portion of 0.052.

According to the invention, ion exchange is performed twice through the first step where the ions for providing a high refractive index are introduced into the glass body and the second step where the ions are diffused out from the glass body to form a distribution of the ions. Therefore the glass body having ions of high concentration for providing a large refractive index is obtained so that it is possible to stably produce a gradient-index lens having a large numerical aperture by using the thus obtained glass body.

Although the invention has been described with respect to the above examples, it should be obvious that there are numerous variations within the scope of the present invention. Thus, the present invention is intended to cover not only the described embodiments and examples, but also those variations falling within the scope of the appended claims.

What is claimed is:

1. A method of producing a gradient-index lens comprising the following steps:

providing a glass body containing first ions and having a shape and optical properties suitable for forming a lens;

first completely immersing said glass body into molten salt containing second ions, which provide said glass body with a refractive index higher than that provided by the first ions in said glass body, to perform ion diffusion into said glass body for sufficient time and at sufficient temperature to thereby exchange first ions in said glass body for said second ions and to thereby uniformly increase the refractive index of said glass body throughout the glass body, such that the increased refractive index of the exchanged glass body is uniform throughout the glass body; and second completely immersing said glass body obtained from said first immersing step into molten salt containing third ions, which provide said glass body with a refractive index lower than that provided by said second ions, for sufficient time and at sufficient temperature to thereby exchange said second ions in said glass body for said third ions so as to form a predetermined refractive index distribution symmetrically in said glass body such that a gradient index lens is provided;

wherein said first ions permit formation of said glass body into a more stable glass body then would be formed if the second ions were present in the glass body instead of said first ions.

2. The method according to claim 1, wherein a cylindrical glass body is used as said glass body so as to produce a gradient-index lens the refractive index of which is gradually radially reduced from the center thereof.

3. The method according to claim 1, wherein a plate-like glass body is used as said glass body so as to produce a gradient-index lens having a refractive index distribution only in the direction of its thickness.

4. The method according to claim 1, wherein spherical glass body is used as said glass body so as to produce a gradient-index lens the refractive index of which is gradually radially changed from the center thereof.

5. The method according to claim 1, wherein in said first completely immersing step, $Ag^+$, $Tl^+$, or $Li^+$ ions are used as said second ions for providing said higher refractive index.

6. The method according to claim 1, wherein a phosphate glass body is used as said glass body, and in said first completely immersing step $Ag^+$ ions are used as said second ions for providing said higher refractive index.

* * * * *